March 5, 1957 P. MAINARDI ET AL 2,783,842
STEREOSCOPIC APPARATUS NOTCHING DEVICES
Filed May 31, 1952
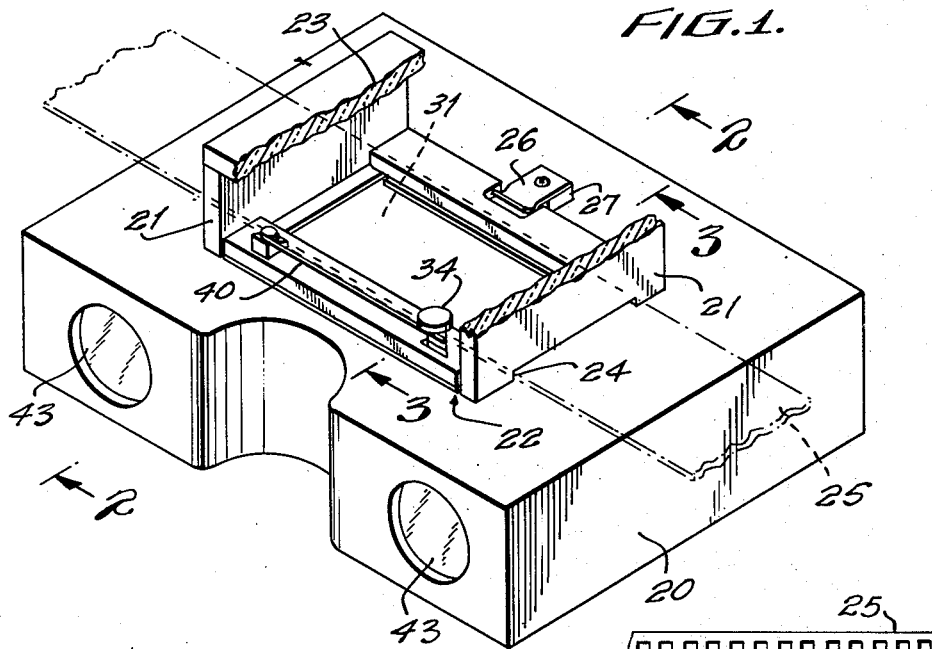
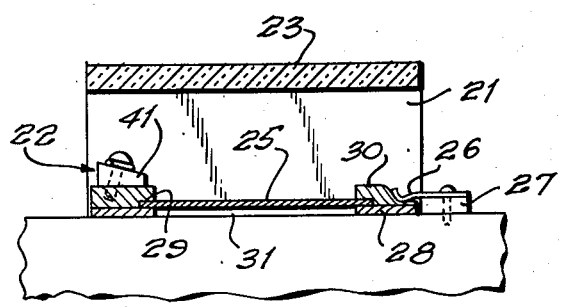
INVENTORS:
POMPEY MAINARDI AND
MARCUS N. MAINARDI
BY United States Patent Office 2,783,842
Patented Mar. 5, 1957

2,783,842

STEREOSCOPIC APPARATUS NOTCHING DEVICES

Pompey Mainardi and Marcus N. Mainardi, Paterson, N. J.

Application May 31, 1952, Serial No. 291,024

8 Claims. (Cl. 164—50)

The present invention relates to film holding and processing devices.

More particularly, the present invention relates to a device adapted to position film on a viewer as well as to notch the film so that it may be properly positioned in a viewer. It is also within the purview of the present invention to provide a device for properly locating a film notched by the notching device on a film mount of paper or the like.

One of the objects of the present invention is to provide a means for notching film having stereo pairs thereon so that the film may be properly located within a viewer or projector.

A further object of the present invention is to provide a device capable of both notching a film and properly positioning the notched film in a viewer or projector.

Another object of the present invention is to provide a means for mounting a notched film in a paper mount or the like.

An additional object of the present invention is to provide a film positioning means which prevents incorrect mounting of the film.

With the above objects in view the present invention mainly consists of a combination notching and positioning devices for stereo pairs arranged in a single film frame, this device including a film guide having an intermediate wall portion and a pair of opposite side portions substantially normal to the intermediate wall portion so that a film strip or image carrying mount may be guided along the intermediate wall portion and between the opposite side portions. This intermediate wall portion of the film guide is formed with an opening to permit light to pass through the intermediate wall portion and film located over the opening therein when the film guide is mounted in a viewer or projector. On one of the side portions of the film guide there is located a notch cutting member which is positioned adjacent to the area through which film passes along the film guide, and the notch cutting member is mounted for movement into and out of this area and in a direction substantially normal to the intermediate wall portion. A spring is located on the film guide and engages the notch cutting member to urge the same into the area through which the film passes so that, after a film strip is notched by the notch cutting member, the latter may be moved by the notched film out of this area and by the spring into this area and into a notch of the notched film strip to properly locate the latter in a viewer or projector on which the film guide is mounted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a diagrammatic illustration of a stereoscope on which the device of the present invention is mounted;

Fig. 2 is a fragmentary sectional view of the structure of Fig. 1 taken along line 2—2 of Fig. 1 in the direction of the arrows;

Fig. 3 is a sectional, enlarged view of the device of the present invention separated from the stereoscope and taken along lines 3—3 of Fig. 1 in the direction of the arrows;

Fig. 4 is a fragmentary, sectional view of the structure of Fig. 3 taken along line 4—4 of Fig. 3 in the direction of the arrows; and Fig. 5 is a fragmentary view of a film strip which has been notched by the structure illustrated in Figs. 1–4.

Referring now to the drawings, there is diagrammatically shown in Fig. 1 a stereoscope 20 having on the upper part thereof a pair of side walls 21 between which the film notching and mounting device 22 of the present invention is adapted to be located. The viewer 20 may be of the construction shown in U. S. Patent 2,313,562. Located over the space between the walls 21 is a piece of frosted glass, or the like, 23 supported by the walls 21 for diffusing the light which passes through the film on the notching and positioning device 22. The side walls 21 are formed with central cut outs 24 at the bottoms thereof to permit the film 25 (shown in dot-dash lines in Fig. 1) to pass through the side walls 21 and the notching and positioning device 22.

The device 22 is properly positioned on the viewer 20 by the side walls 21 and is releasably held in position by a leaf spring 26 mounted on the viewer and engaging the device 22, this leaf spring 26 being mounted on a member 27 which engages the device 22 to properly locate the same along the length of side walls 21. The device 22, shown sectionally in Fig. 2, includes a wall portion 28 and opposite side portions 29 and 30. The wall portion 28 is formed with a substantially rectangular aperture 31 having substantially the same size as a film frame so that light may pass through the aperture 31 and film 25 located thereover when the device 22 is located in a viewer or projector. The opposite sides 29 and 30 have under surface portions located opposite and slightly spaced from the wall 28 so as to form as shown in Fig. 3 a pair of opposite slots 32 and 38 through which the opposite side edges of the film 25 respectively pass.

The side portion 29 and the wall portion 28 are formed with a triangular opening 33, as shown in Figs. 3 and 4, passing therethrough and in which a notch cutting member 34 is located. Intersecting edge portions of two walls of the opening 33 extend across the slot 38 so that the bottom cutting end 35 of cutting member 34 may pass across the slot 38 to produce a V-shaped notch in the film.

On the side portion 29 of the device 22 there is fixedly mounted a guide member 37 having a V-shaped groove therein which cooperates with the right hand edge portion of the cutting member 34, as viewed in Fig. 3, to guide the latter for reciprocating movement across the slot 38 so as to cut a film edge portion located therein.

As is shown in Fig. 3, the cutting member 34 is provided with a groove 39 located below the top of guide 37, as viewed in Fig. 3, and an elongated spring member 40 is fixedly mounted at one end on the device 22 and passes through the groove 39. The spring 40 is mounted on a support 41 fixedly located on side portion 29 and having a top surface which is inclined as illustrated in Figs. 2 and 3 so that the spring 40 urges the cutting member 34 in a direction which is inclined downwardly to the right, as viewed in Fig. 3. Thus, the spring 40 not only urges the cutting member 34 downwardly toward the wall portion 28, but it also urges member 34 to the right, as viewed in Fig. 3, so that it is maintained in engagement with the guide 37 and the right hand portion of opening 33, as viewed in Fig. 3. As is apparent from Fig. 1, the cutting member 34 is located adjacent an end of the device 22 so that the notch will not be located at the center of a film frame. As is apparent from Figs. 3 and 4, the opening 33 is of a larger size than the member 34 so that the bottom portion thereof may be moved to the left, as viewed in Fig. 3, against the action of spring 40 and transversely in the opening 33.

The above described structure operates as follows:

Assuming that one has a length of un-notched film with a plurality of stereo pairs thereon, the present invention makes it possible to use the same device for notching this film and locating the same, after it is notched, in a viewer as shown in Fig. 1 or a projector. The length of un-notched film is first passed through a cut out 24 of a wall 21 and then into the slots 32 and 38 and along the wall portion 28 of the device 22 which has been positioned between the walls 21, the device 22 thus acting as a channel-shaped film guide. If the cutting member 34 should happen to be in the position shown in Fig. 3, the left edge of the film 25, as viewed in Fig. 3, will simply move the bottom end of the member 34 against the action of spring 40 to the left, as viewed in Fig. 3, so that it will not obstruct the movement of the film 25 through the slots 32 and 38 and the opening 24 in the opposite wall 21. The cutting member 34 is grasped by its head 42 and moved upwardly, as viewed in Fig. 3, against the action of spring 40 so that the cutting end 35 thereof will be located over the left edge portion of the film 25, as viewed in Fig. 3. The film itself will prevent the cutting member 34 from moving downwardly, as viewed in Fig. 3, or, if the spring 40 is relatively weak the friction between the cutting member 34 and the opening 33 and member 37 will maintain it in a raised position.

The operator then views the stereo images through the oculars 43 of the viewer 20, and it is likely that the film will not be properly positioned when this is done. While viewing the images through the oculars 43, the operator moves the film 25 along the device 22 until the stereo images are properly superimposed so that the desired three dimensional effect is produced without any eye-straining defects. When this has been done the operator knows that the stereo images of the film frame located over the wall portion 28 are properly positioned, and he presses downwardly on the cutting member 34, as viewed in Fig. 3, so that the cutting end 35 thereof will produce a V-shaped notch 36 in the film. Then the operator moves the film along the device 22 to properly locate the next stereo pair in the viewer 20. The cutting member 34 may be raised directly after a notch is produced by the same, or it may simply be moved to the left, as viewed in Fig. 3, by the film and then raised and lowered to produce a notch in the film when the latter is properly located. This process is repeated for all of the stereo pairs.

When a film strip has been notched, as shown in Fig. 5, the same device 22 may be used to locate the film properly on the viewer. The film is threaded through the device 22 and walls 21 in the same way as described above, and the member 34 remains in the downward, right hand position shown in Fig. 3 during this time. It is never moved up during the viewing of already notched film. As the film strip moves along the slot 38, the edge of the film moves the bottom end of member 34 to the left, as viewed in Fig. 3, and when a notch 36 becomes aligned with the member 34 the operator hears a click and feels a slightly increased resistance to the movement of the film so that he knows that the film is properly located by the member 34. After viewing one stereo pair, the operator simply moves the film along until he again hears the click of the member 34 moving into the next notch 36 so that he knows the next stereo pair is properly located.

It will be understood that each of the elements described above, or two or more together, may also find a useful application in other types of film holding and processing devices, differing from the types described above.

While the invention has been illustrated and described as embodied in a film holding and processing device for notching and positioning stereo pairs in a viewer or projector, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A combination notching and guiding device, comprising, in combination, a guide having a wall portion along which a film strip or the like is adapted to move in a predetermined plane and a side portion having a surface located opposite and slightly spaced from said wall portion to form therewith a slot in which an edge portion of a film or the like may be located, said guide being formed with an opening passing through said side and wall portions thereof and said slot and extending in a direction substantially normal to said plane; an elongated notch cutting member mounted in said opening for reciprocating movement across said slot so as to notch a film edge portion or the like located therein, said notch cutting member being of a smaller size than said opening so as to be transversely movable therein, and said opening being large enough to allow the unnotched edge of the film to push the notch cutting member transversely into a withdrawn position; and resilient means mounted on said guide and engaging said notch cutting member, said resilient means urging said notch cutting member transversely in said slot to engage an edge of a film strip in said slot, so that said notch cutting member may be used to locate a notched film strip or the like on said guide, said resilient means mounting said cutting member for movement substantially normal to said plane, and said cutting member being held so as to substantially normal intersect said plane.

2. A film notching device, comprising, in combination, a film guide having a wall portion along which film is adapted to move in a predetermined plane and a side portion having a surface located opposite and slightly spaced from said wall portion to form therewith a slot in which a film edge portion may be located, said film guide being formed with an opening of a substantially triangular cross-section extending through said side portion and wall portion and at least partially across said slot with intersecting edge portions of two sides of said triangular opening overlapping said plane; an elongated notch cutting member having a bottom cutting end, being of a substantially triangular cross-section, and being mounted in said opening for reciprocating movement along the length thereof so that said bottom cutting end of said cutting member moves across said slot to produce a V-shaped notch in a film edge portion located in said slot, said cutting member being of a smaller size than said opening so as to be movable into and out of said intersecting edge portions thereof, and said opening being large enough to allow the unnotched edge of the film to push the notch cutting member transversely into a withdrawn position; and spring means mounted on said film guide and engaging said cutting member, said spring means urging said notch cutting member transversely in said slot to engage an edge of a film strip in said slot, said spring means mounting said cutting member for movement substantially normal to said plane, and said cutting member being held to as to substantially normally intersect said plane.

3. Apparatus for notching and positioning a transparency, comprising in combination, a device for producing an image of a transparency; guide means mounted on said device for guiding a transparency into and out of a predetermined area located in a predetermined plane at a position where a desired image is produced by said device; a cutter mounted on said guide means for movement through said plane in a direction substantially normal thereto at an edge portion of said area, so as to produce a notch in a part of a transparency located in said area, and for lateral movement in said plane and edge portion of said area, said cutter being located at the exterior of said device and film guide means so as to be freely accessible to the operator; and spring means operatively connected to said cutter for applying to the same a force inclined to said plane and having one component normal to said plane and another component parallel to said plane, said parallel component of the force applied by said spring means urging said cutter transversely in said slot to engage with an edge of a transparency in said slot so that after a notch is cut by said cutter, the latter may be used to position the transparency in said guide means on said device, said spring means mounting said cutter for movement substantially normal to said plane and said cutter being held so as to substantially normally intersect said plane.

4. Apparatus for notching and positioning a transparency, comprising, in combination, a device for producing an image of a transparency; a transparency guide mounted on said device and having a side edge portion formed with a groove located in a predetermined plane which includes an area located partly in said groove and in which the transparency is located when a desired image is produced by said device, said edge portion of said guide being formed with an opening passing therethrough and intersecting said groove so that an edge portion of a transparency in said groove and area will be located in a part of said opening; a cutter having a cross section smaller than said opening and being located therein for movement therethrough, said cutter being located at the exterior of said device and guide so as to be freely accessible to the operator to be moved through said opening to cut a notch in an edge portion of the transparency, said opening being large enough to allow the unnotched edge of the transparency to push the cutter transversely into a withdrawn position; and spring means operatively connected to said cutter, said spring means urging said cutter transversely in said slot to engage with an edge of a transparency in said slot so that said cutter may also be used to position a notched transparency in said guide, said spring means mounting said cutter for movement substantially normal to said plane and said cutter being held so as to substantially normally intersect said plane.

5. Apparatus for notching and positioning a transparency, comprising, in combination, a device for producing an image of a transparency; a transparency guide mounted on said device and having a side edge portion formed with a groove located in a predetermined plane which includes an area located partly in said groove and in which the transparency is located when a desired image is produced by said device, said edge portion of said guide being formed with an opening passing therethrough and intersecting said groove so that an edge portion of a transparency in said groove and area will be located in a part of said opening; a cutter having a cutting end located adjacent said area and having an opposite operating end located at the exterior of said guide and device so as to be freely accessible to the operator, said cutter being located in said opening and being of a smaller size than the same; and spring means mounted on said guide and engaging said cutter to exert on the latter a force inclined to said plane, passing through said area, and having one component passing normally through said plane and another component parallel to said plane, so that said cutter may be moved substantially normally through said plane and an edge portion of said area to notch an edge portion of a transparency and so that said cutter will be maintained by said spring means in a position extending substantially normally through said plane, said parallel component of the force applied by said spring means urging said cutter transversely in said slot to engage with an edge of a transparency in said slot so that said cutter may cooperate with a notch in a transparency to properly position the latter, said opening being large enough to allow the unnotched edge of the transparency to push the cutter transversely into a withdrawn position.

6. Apparatus as defined in claim 5 and wherein said opening is of a V-shaped cross section at a part thereof overlapping said area and wherein said cutter has an edge portion of V-shaped cross section slidably engaging said part of said opening.

7. Apparatus as defined in claim 5 and wherein said cutter is formed with a cutout intermediate the ends thereof and wherein said spring means includes a wire spring extending through said cutout and engaging said cutter.

8. Apparatus as defined in claim 7 and wherein a block is fixed to said guide and is provided with a face inclined to said plane, said wire spring being fixed to said face of said block so as to exert said force on said cutter.

References Cited in the file of this patent

UNITED STATES PATENTS

| | | |
|---|---|---|
| 1,932,464 | Hyde | Oct. 31, 1933 |
| 2,165,540 | Engel | July 11, 1939 |
| 2,299,266 | Engel | Oct. 20, 1942 |
| 2,347,249 | Brewton | Apr. 25, 1944 |
| 2,444,732 | Fitch | July 6, 1948 |
| 2,495,047 | Afton | Jan. 17, 1950 |
| 2,505,250 | Kime | Apr. 25, 1950 |